United States Patent
Matsuo et al.

(10) Patent No.: US 10,712,794 B2
(45) Date of Patent: Jul. 14, 2020

(54) ACCURATE CALCULATION OF CONSUMPTION POWER OF A PROCESSOR CAUSED BY EXECUTION OF A PROGRAM

(71) Applicant: FUJITSU LIMITED, Kawasaki-shi, Kanagawa (JP)

(72) Inventors: Miyuki Matsuo, Yokohama (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 15/894,063

(22) Filed: Feb. 12, 2018

(65) Prior Publication Data
US 2018/0246555 A1 Aug. 30, 2018

(30) Foreign Application Priority Data
Feb. 24, 2017 (JP) .................................. 2017-034078

(51) Int. Cl.
*G06F 1/32* (2019.01)
*G06F 1/28* (2006.01)

(52) U.S. Cl.
CPC . *G06F 1/28* (2013.01); *G06F 1/32* (2013.01)

(58) Field of Classification Search
CPC . G06F 1/28; G06F 1/32; G06F 1/3206; G06F 1/3228; G06F 11/3428; G06F 11/3447; G06F 11/3476; G06F 11/3466; G06F 11/3495; G06F 11/3062; G06F 11/3058; G01R 31/31721; Y02D 10/34
See application file for complete search history.

(56) References Cited

U.S. PATENT DOCUMENTS

| | | | |
|---|---|---|---|
| 6,609,208 B1* | 8/2003 | Farkas | G06F 1/28 713/320 |
| 2005/0177327 A1* | 8/2005 | Banginwar | G06F 1/3203 702/60 |

(Continued)

FOREIGN PATENT DOCUMENTS

| | | |
|---|---|---|
| JP | H06-19592 A | 1/1994 |
| JP | 2012-133505 A | 7/2012 |
| WO | 2012/001779 A1 | 1/2012 |

OTHER PUBLICATIONS

Miyuki Ono et al., "Sampling-based Power-Measument Method", High Performance Computing Symposium 2016, HPCS2016-031 Jun. 7, 2016, English Abstract, pp. 111-120 (Total 10 pages).

*Primary Examiner* — Jaweed A Abbaszadeh
*Assistant Examiner* — Brian J Corcoran
(74) *Attorney, Agent, or Firm* — Fujitsu Patent Center

(57) ABSTRACT

An apparatus is configured to calculate consumption power of a processor caused by execution of a program, based on sampling data acquired by event-based sampling. The apparatus determines whether the processor is in an idle state, by using the sampling data of a clock event, where the clock event is an event which generates an interrupt at fixed time intervals when the processor is not in the idle state, and which generates the interrupt when a state of the processor changes from the idle state to a non-idle state. In a case where the processor is in the idle state, the apparatus calculates a first amount of consumption power of the processor in the idle state, based on a second amount of consumption power calculated using a consumption power model and a third amount of consumption power included in the sampling data.

6 Claims, 9 Drawing Sheets

(56) References Cited

U.S. PATENT DOCUMENTS

| | | | | |
|---|---|---|---|---|
| 2006/0155415 | A1* | 7/2006 | Lefurgy | G06F 1/3228 700/130 |
| 2008/0162976 | A1* | 7/2008 | Bennett | G06F 1/04 713/502 |
| 2009/0320000 | A1* | 12/2009 | Saxe | G06F 1/3203 717/128 |
| 2009/0327784 | A1* | 12/2009 | Shah | G06F 11/3006 713/340 |
| 2010/0058079 | A1* | 3/2010 | Yamamoto | G06F 1/3203 713/300 |
| 2012/0053897 | A1* | 3/2012 | Naffziger | G06F 1/3206 702/182 |
| 2013/0117596 | A1* | 5/2013 | Furukawa | G06F 11/3409 713/340 |
| 2015/0261287 | A1* | 9/2015 | Ishihara | G06F 1/3206 713/320 |
| 2016/0252949 | A1* | 9/2016 | Virolainen | G06F 11/3062 713/323 |

* cited by examiner

FIG. 6A

| MODULE NAME::FUNCTION NAME | CONSUMPTION POWER | RATIO |
|---|---|---|
| programA::funcA | 100 J | 50.0% |
| programA::funcB | 80 J | 40.0% |
| glibc::memcpy | 20 J | 10.0% |

FIG. 6B

| MODULE NAME::FUNCTION NAME | CONSUMPTION POWER | RATIO |
|---|---|---|
| programA::funcB | 80 J | 40.0% |
| programA::funcA | 60 J | 30.0% |
| IDLE | 40 J | 20.0% |
| glibc::memcpy | 20 J | 10.0% |

CONSIDERATION (ADDITION) OF IDLE STATE (IDLE) CAUSES CONSUMPTION POWER OF FUNCTION (funcA) TO CHANGE

FIG. 7

| MODULE NAME::FUNCTION NAME | CONSUMPTION POWER | RATIO |
|---|---|---|
| programX::funcX | 160 J | 80.0% |
| glibc::memcpy | 20 J | 10.0% |
| programX::funcY | 20 J | 10.0% |

HOT SPOT OF POWER

ACCURATE CALCULATION OF CONSUMPTION POWER OF A PROCESSOR CAUSED BY EXECUTION OF A PROGRAM

CROSS-REFERENCE TO RELATED APPLICATION

This application is based upon and claims the benefit of priority of the prior Japanese Patent Application No. 2017-34078, filed on Feb. 24, 2017, the entire contents of which are incorporated herein by reference.

FIELD

The embodiments discussed herein are related to accurate calculation of consumption power of a processor caused by execution of a program.

BACKGROUND

In recent years, consumption power of Information and Communication Technology (ICT) system has been increasing, and thus there has been a demand for suppression in consumption power. For example, some supercomputers consume 15 MW or more. In the case of supercomputers having high power efficiency, 6.674 GFlops/W has been achieved. However, to achieve 1 EFlops, consumption power will be as high as $10^{18}/(6.674 \times 10^9)$=150 MW. It is difficult to realize a supercomputer that consumes such high power.

To optimize programs from the point of view of reducing consumption power, a technique has been developed to identify a hot spot where a program consumes high power. Identifying a hot spot makes it possible to reduce the consumption power of the program by tuning the hot spot. For example, in one of techniques to identify hot spots, consumption power is sampled at fixed time intervals, and a consumption power profile is produced with reference to information on operation programs that have been sampled at similar time intervals thereby identifying a hot spot.

FIG. 7 is a diagram illustrating an example of a consumption power profile. In FIG. 7, consumption power of a function of a program and the ratio of consumption power of the function to the total consumption power of the program are illustrated for each function. As illustrated in FIG. 7, a function "funcX" of a module "programX" is "160 J (Joule)" in consumption power, and the ratio of the consumption power to the total consumption power of the program is "80%". Thus, the function "funcX" is a hot spot of consumption power.

To produce a consumption power profile, consumption power is sampled at fixed time intervals. However, the sampling of consumption power at fixed time intervals does not allow an accurate estimation of consumption power. FIG. 8A is a diagram for illustrating sampling at fixed time intervals. In the example illustrated in FIG. 8A, consumption power is acquired by generating an interrupt at fixed time intervals, and the consumption power is calculated for each function based on information about the function being executed when the interrupt is generated. In FIG. 8A, a horizontal axis indicates time, and a vertical axis indicates power. The power is expressed in units of 3 (Joules).

In FIG. 8A, consumption power of a function A is represented in a highlighted manner, while consumption power of a function B is represented without being highlighted. As illustrated in FIG. 8A, the consumption power is 12 J for both functions A and B. However, in this example illustrated in FIG. 8A where the consumption power is sampled at fixed time intervals, consumption power is measured as 7 J at first sampling. At this sampling point when the first sampling is performed, the function A is being executed, and thus it is regarded that the consumption power of the function A is 7 J.

At second sampling, the consumption power is measured as 8 J. At this sampling point, the function A is also being executed in the present example, and thus the consumption power of the function A is regarded as 7 J+8 J=15 J. At third sampling, the consumption power is measured as 6 J. At this sampling point, the function B is being executed in the present example, and thus the consumption power of the function B is regarded as 6 J. At fourth sampling, the consumption power is measured as 3 J. At this sampling point, the function A is being executed in the present example, and thus the consumption power of the function A is regarded as 15 J+3 J=18 J.

Although the actual consumption power is 12 J for both functions A and B, the consumption power estimated via sampling measurement performed four times is 18 J for the function A and 6 J for the function B, and thus the estimated consumption power is not accurate.

To handle the above situation, in one of known techniques, consumption power is sampled each time a fixed amount of power is consumed. FIG. 8B is a diagram illustrating an example in which sampling is performed each time a fixed amount of power is consumed. In FIG. 8B, as with the case illustrated in FIG. 8A, the actual consumption power is 12 J for both functions A and B.

In this example in which sampling is performed each time power of 6 J is consumed as illustrated in FIG. 8B, the amount of consumption power of the function A is measured as 6 J because the function A is being executed when the first-time sampling is performed. When second-time sampling is performed, the function B is being executed, and thus the consumption power of the function B is measured as 6 J.

The function B is being executed when third-time sampling is performed, and thus the consumption power of the function B is estimated as 6 J+6 J=12 J. The function A is being executed when fourth-time sampling is performed, and thus the consumption power of the function A is estimated as 6 J+6 J=12 J.

As described above, in the case where sampling is performed each time a particular fixed amount of power is consumed, that is, in the case where consumption power-based sampling is performed, more accurate estimation of consumption power of each function is possible compared with the case where sampling is performed at fixed time intervals, that is, compared with the case where time-based sampling is performed. However, it is difficult to generate an interrupt for sampling each time a particular fixed amount of power is consumed. In view of the above, to achieve sampling such that the amount of consumption power measured at each sampling point is as close to a fixed value as possible, it is known to perform event-based sampling in which sampling is performed in response to an occurrence of an event closely related to consumption power.

FIG. 9 is a diagram illustrating an example in which event-based sampling is performed. In this example illustrated in FIG. 9, when an event occurs 1000 times, an overflow interrupt occurs, and consumption power and data about a program being executed are acquired.

In one of known techniques, the value of the number of times inputs are sensed per unit time is measured as well as a process is performed according to an instruction issued by a program, and an idle state is detected by comparing the measured value to a value which has been measured in an idle state. In response to detecting the idle state, an operation mode is switched from a normal operation mode to a power saving mode thereby achieving an improvement in efficiency in saving power.

In another one of known techniques, the difference between processing power of an assigned process and idle power is integrated with respect to time taken for the process, and based on incremental processing power obtained as a result of the time integration, a proper combination of servers to which the process is assigned is selected thereby making it possible to select a combination of servers that results in a significant reduction in power consumption.

In another one of known techniques, the amount of power consumed when each event occurs is measured in advance, and power consumed by a program is calculated from the beforehand measured amount of consumption power and the number of times each event occurs during an execution of the program thereby making it possible to calculate a reasonable value of power consumed, in each program, by an information processing apparatus.

Descriptions of related techniques may be found, for example, in Japanese Laid-open Patent Publication No. 6-19592, Japanese Laid-open Patent Publication No. 2012-133505, and International Publication Pamphlet No. WO2012/001779.

A description of related techniques may be found also in "Sampling-based Power-Measurement Method", Miyuki Ono, Masao Yamamoto, and Kohta Nakashima, HPCS2016-031.

SUMMARY

According to an aspect of the invention, an apparatus is configured to calculate consumption power of a processor caused by execution of a program, based on sampling data acquired by event-based sampling. The apparatus determines whether the processor is in an idle state, by using the sampling data of a clock event, where the clock event is an event which generates an interrupt at fixed time intervals when the processor is not in the idle state, and which generates the interrupt when a state of the processor changes from the idle state to a non-idle state. In a case where the processor is in the idle state, the apparatus calculates a first amount of consumption power of the processor in the idle state, based on a second amount of consumption power calculated using a consumption power model and a third amount of consumption power included in the sampling data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating an example of an effect achieved by a power data analysis unit, according to an embodiment;

FIG. 7 is a diagram illustrating an example of a consumption power profile;

DESCRIPTION OF EMBODIMENTS

Figure 9:
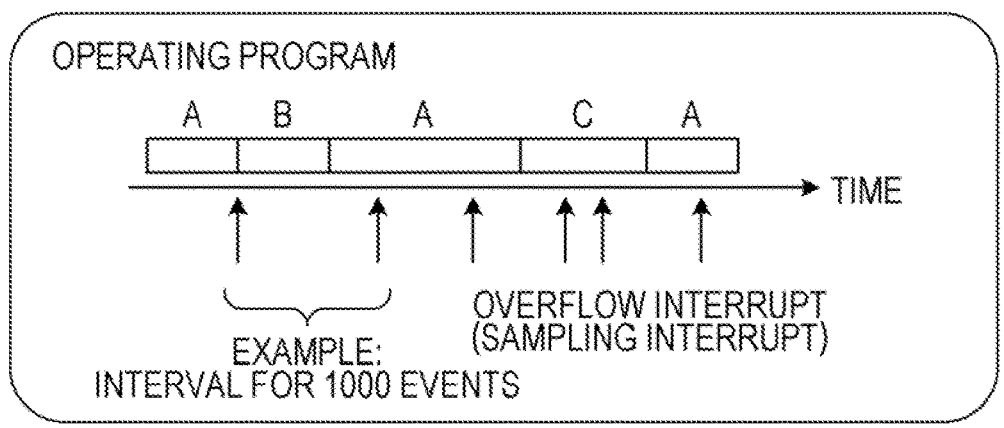
FIG. 9 is a diagram illustrating an example of event-based sampling.
Figure 10:
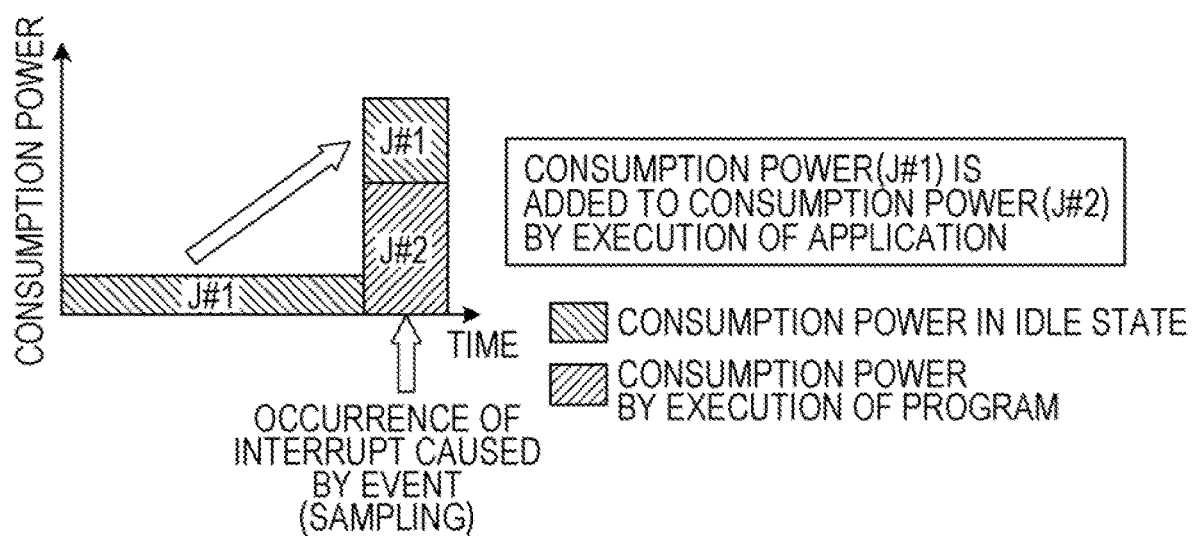
FIG. 10 is a diagram illustrating a problem in power measurement by event-based sampling.

The power measurement by the event-based sampling illustrated in FIG. 9 has a problem that when an execution of a program is started, if power has been consumed in an idle state until the start of the program, it seems as if this power is consumed during the execution of the program. FIG. 10 is a diagram illustrating this problem that occurs when power is measured by event-based sampling. In FIG. 10, J #1 represents consumption power in an idle state, and J #2 represents consumption power during an execution of a program.

Power is consumed even when a Central Processing Unit (CPU) is in an idle state, and the consumption power increases as the idle time increases. In the event-based sampling, it is not detected whether the CPU has been in an idle state or not. Furthermore, in an idle state, no interrupt occurs when an event occurs. Therefore, as can be seen from FIG. 10, the power J #1 consumed during the idle state seems to be consumed by the program executed immediately after the idle state, and thus J #1 is added to the power J #2 actually consumed by the program executed immediately after the idle state.

It is preferable to accurately calculate the amount of consumption power of a processor caused by execution of a program.

An Information processing apparatus, an information processing method, and a program according to embodiments of the present disclosure are described in detail below with reference to drawings. Note that these embodiments are described by way of example but not limitation.

EMBODIMENTS

Figure 1:
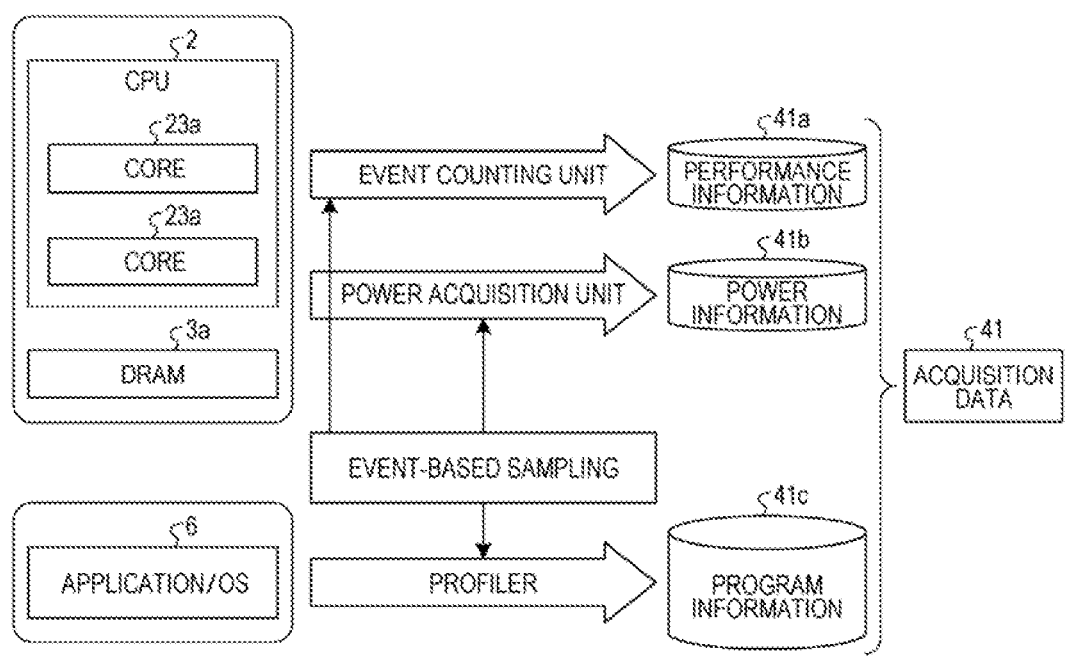
FIG. 1 is a diagram illustrating an example of acquisition data acquired by an information processing apparatus according to an embodiment.

First, acquisition data acquired by an information processing apparatus according to an embodiment is described. FIG. 1 is a diagram illustrating an example of acquisition data acquired by the information processing apparatus according to the embodiment. As illustrated in FIG. 1, acquisition data 41 acquired by the information processing apparatus according to the embodiment includes performance information 41a, power information 41b, and program information 41c.

The performance information 41a is information on a performance of a CPU 2. Examples of the performance information 41a Include the number of cache misses and the number of prefetches of access to a cache. The performance information 41a includes information on a performance of cores 23a.

The performance information 41a also includes a value of a CLK event. The CLK event is an event of counting the number of cycles during an operation of the CPU, and the CLK event is used as an event for performing sampling at fixed time intervals. The value of the CLK event is used in determining whether an idle state occurs or not.

The performance information 41a is acquired by event-based sampling, and more specifically, a value of an event counter unit is acquired. A description will be given later as to the event counter unit and as to a manner of determining whether an idle state occurs based on the value of the CLK event.

The power information 41b is information on amount of consumption power. The power information 41b is obtained by acquiring a value of power acquisition unit by event-based sampling. A description of the power acquisition unit will be given later.

The program information 41c is information as to application/Operating System (OS) 6 that is in operation when sampling is performed. Examples of program information 41c include a process ID and an instruction address. The program information 41c is acquired by a profiler via event-based sampling. Use of the program information 41c makes it possible to relate a program to amount of consumption power.

Figure 2:
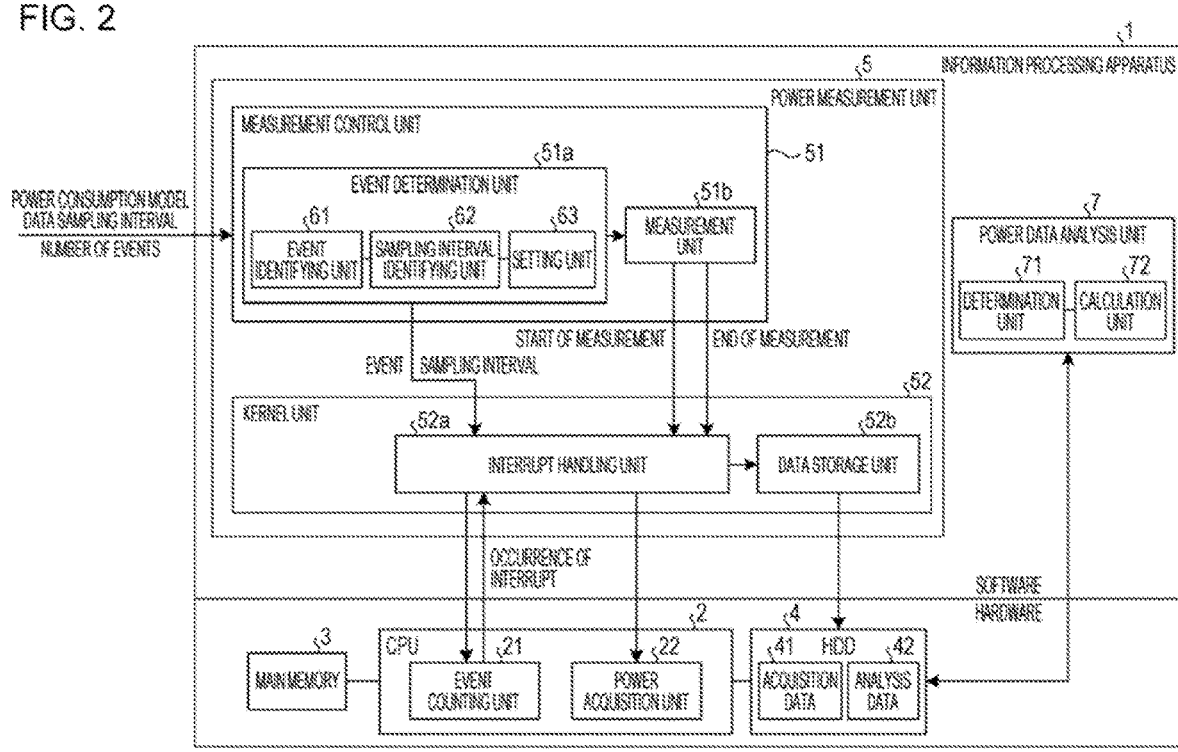
FIG. 2 is a diagram illustrating an example of a configuration of an information processing apparatus according to an embodiment.

Next, a configuration of an information processing apparatus according to an embodiment is described below. FIG. 2 is a diagram illustrating an example of a configuration of the information processing apparatus according to the embodiment. As illustrated in FIG. 2, the information processing apparatus 1 includes, as hardware, a CPU 2, a main memory 3, and a Hard Disk Drive (HDD) 4, and also includes a power measurement unit 5 and a power data analysis unit 7 which are realized by software.

The CPU 2 is a central processing unit that reads out a program from the main memory 3 and executes it. The main memory 3 is a Random Access Memory (RAM) that stores a program and an intermediate result during an execution of the program. The HDD 4 is a disk drive that stores a program and data.

The CPU 2 includes an event counter unit 21 and a power acquisition unit 22. The event counter unit 21 includes an event setting register and a counter register. The event setting register is used to set a type of an event that occurs in the CPU 2, and the counter register is for counting the occurrences of the event. Examples of events include a cache miss of an L3 (Level 3) cache and a prefetch of access to L2 cache. Note that the CLK event is one of events. The event counter unit 21 includes a plurality of combinations of an event setting register and a counter register. A type of an event and the number of occurrences of the event are acquired as performance information 41a when sampling is performed.

The event setting register is capable of specifying whether to generate an interrupt. When an event, specified as an event that is to cause a generation of an interrupt, occurs as many times as the number set in the counter register, the event counter unit 21 generates an interrupt to the CPU 2. The number set in the counter register is referred to as the sampling interval for the event. For example, in the x-86 architecture, the event counter unit 21 is a Performance Monitoring Counter (PMC).

Figure 3:
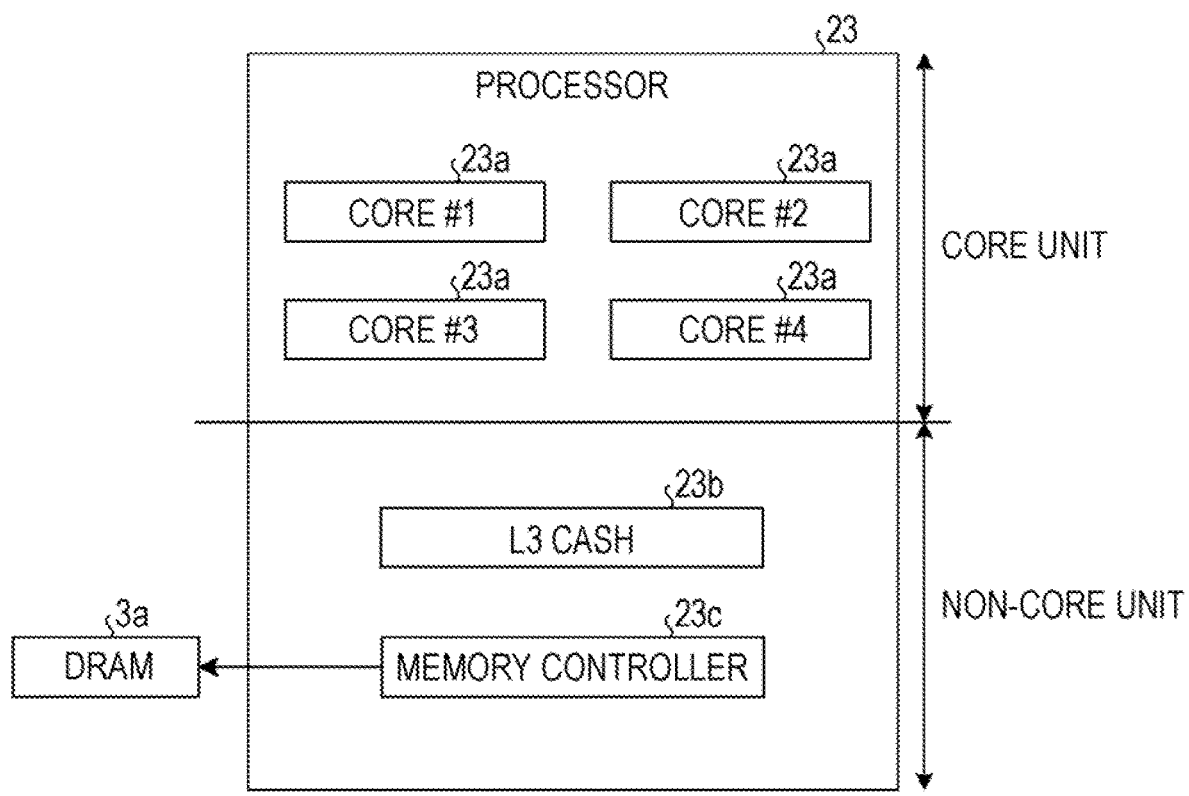
FIG. 3 is a diagram illustrating an example of a configuration of a processor, according to an embodiment.

The power acquisition unit 22 acquires information in terms of the amount of consumption power and the like for the processor, the cores as a whole included in the processor, and the RAM. FIG. 3 is a diagram illustrating an example of a configuration of the processor. The processor 23 includes four cores 23a in a core unit. The processor 23 also includes, in a non-core unit, an L3 cache 23b, and a memory controller 23c.

Each core 23a is an operation processing apparatus that performs an operation. The L3 cache 23b is a cache memory for temporarily storing part of data stored in the DRAM 3a. The memory controller 23c controls access to the DRAM 3a. The DRAM 3a corresponds to the main memory 3 illustrated in FIG. 2. The processor 23 is included in the CPU 2 illustrated in FIG. 2.

The power acquisition unit 22 is capable of acquiring the total amount of consumption power of all cores, but is not capable of acquiring the amount of consumption power separately for each core. The power acquisition unit 22 is not capable of generating an interrupt on an amount-of-consumption-power basis. The power acquisition unit 22 is, for example, Running Average Power Limit (RAPL) provided by Intel (registered trademark).

Referring again to FIG. 2, the power measurement unit 5 samples data via the event counter unit 21 and the power acquisition unit 22 such that the amount of consumption power measured at each sampling point is as close to a fixed value as possible. However, the information processing apparatus 1 does not have a function of generating an interrupt each time a particular fixed amount of power is consumed. Therefore, the power measurement unit 5 identifies an event related to consumption power, and generates an interrupt based on the identified event such that the amount of consumption power measured at each sampling point is as close to a fixed value as possible.

That is, the power measurement unit 5 performs event-based sampling. Via the event-based sampling, the power measurement unit 5 acquires the performance information 41a, the power information 41b, and the program information 41c. The power measurement unit 5 includes a measurement control unit 51 and a kernel unit 52.

The measurement control unit 51 controls the sampling of data based on the event and the data sampling interval. The measurement control unit 51 includes an event determination unit 51a and a measurement unit 51b. The event determination unit 51a receives inputs of a consumption power model, a data sampling interval, and the number of events, and performs a process related to an event used in sampling data.

The consumption power model is a model for calculating the consumption power of the processor 23, the DRAM 3a, and the like, based on events that occur in the CPU 2. A consumption power model of the core 23a is, for example, consumption power $[W] = 13.06 + 7.136 \times C + 1.157 \times 10^{-7} \times L2\_TRANS.ALL\_PF + 3.841 \times 10^{-8} \times LONGEST\_LAT\_CACHE.MISS$.

In the above equation, C denotes the active operation rate of the CPU 2 and is calculated from the core performance information. L2_TRANS.ALL_PF denotes the number of prefetches of access to the L2 cache. The prefetching of access to the L2 cache is an event that is allowed to be set in the event setting register. LONGEST_LAT_CACHE.MISS indicates the number of cache miss by the L3 cache 23b. The cache miss of the L3 cache 23b is an event that is allowed to be set in the event setting register.

The consumption power model of the DRAM 3a is, for example, consumption power [W]=2.753+2.18×10$^{-7}$×LONGEST_LAT_CACHE.MISS.

The data sampling interval indicates the amount of consumption power in a period until next sampling starts. The number of events is the number of types of events that are to cause generation of an interrupt. However, the CLK event is not counted in the number of events. If the CLK event is included in the number of events, an interrupt occurs in response to as many types of events as the number of events+1.

The event determination unit 51a includes an event identifying unit 61, a sampling interval identifying unit 62, and a setting unit 63. The event identifying unit 61 receives inputs of the consumption power model and the number of events, and identifies an event, other than the CLK event, that is to cause generation of an interrupt. For example, in a case where the number of events is 1, the event identifying unit 61 detects an event that has a largest coefficient in the consumption power model, and identifies the detected event as an event that is to cause generation of an interrupt.

Let it be assumed, for example, the consumption power model is given by equation (1) described below $$\text{Consumption power}=0.003\times\text{number of }L3\text{cache misses}+0.001\times\text{number of accesses to the }L2\text{cache} \quad (1)$$

In this case, if the specified number of events is 1, the L3 cache miss is identified as an event that is to cause generation of an interrupt.

For example, in a case where the number of events is two or more, the event identifying unit 61 selects as many events as specified by the number of events from events having high coefficients in the consumption power model, and the event identifying unit 61 identifies these events as events that are to cause generation of interrupts. In a case where the consumption power model is given by equation (1) described above, and the specified number of events is 2, the L3 cache miss and the L2 cache access are identified as events that are to cause generation of an interrupt. However, when an event has a very small coefficient compared with other coefficients, this event is not selected even if the event is within the specified number of events.

For example, the event identifying unit 61 displays a plurality of consumption power models on a display apparatus, and prompts a user to select one of the consumption power models with a mouse thereby receiving an input of the consumption power model. For example, the event identifying unit 61 prompts a user to input the number of events via a keyboard.

The sampling interval identifying unit 62 identifies the sampling intervals for the events identified by the event identifying unit 61 based on the data sampling interval and the coefficients of the events in the consumption power model. More specifically, the sampling interval identifying unit 62 multiplies the reciprocal of the coefficient of each event by the sampling interval of the consumption power, and employs the result as the sampling interval for the event. That is, the sampling interval for an event=the sampling interval of the amount of consumption power/the coefficient of the event.

For example, in a case where the sampling interval of the amount of consumption power is 6 J and the consumption power model is given by equation (1) described above, the sampling interval for the L3 cache miss=6/0.003=2000, and the sampling interval for the L2 cache access=6/0.001=6000.

Note that in a case where the number of events is 1, power consumed by any other events is not taken into account. Therefore, in this case, the sampling interval identifying unit 62 may reduce the sampling interval by adding a particular value α to the coefficient of the event. For example, in a case where only the number of L3 cache misses is specified as the event, and α=0.001, the sampling interval may be set as the sampling interval=6/(0.003+0.001)=1500.

The sampling interval identifying unit 62 may prompt a user to input the data sampling interval via a keyboard. Alternatively, the sampling interval identifying unit 62 may prompt a user to input, via a keyboard, the total amount of consumption power of a program to be measured and the number of samples, and the sampling interval identifying unit 62 may calculate the sampling interval of the amount of consumption power as the total amount of consumption power/the number of samples. For example, in a case where the total amount of consumption power is 12000 J and the number of samples is 2000, the data sampling interval=12000 J/2000=6 J.

The setting unit 63 instructs the kernel unit 52 to set, in the event counter unit 21, the event and the sampling interval identified by the event determination unit 51a. The setting unit 63 also instructs the kernel unit 52 to set, in the event counter unit 21, the CLK event and the sampling interval thereof.

The measurement unit 51b instructs the kernel unit 52 to start measuring the consumption power by using the event and the sampling interval set by the setting unit 63. The measurement unit 51b also instructs the kernel unit 52 to end the measurement when a specified measurement time has expired.

The kernel unit 52 is realized by a kernel function of an Operating System (OS). The kernel unit 52 includes an interrupt handling unit 52a and a data storage unit 52b.

The interrupt handling unit 52a is activated by an interrupt issued by the event counter unit 21 and acquires the acquisition data 41 including the performance information 41a, the power information 41b, and the program information 41c. The interrupt handling unit 52a stores the acquired data as sampling data in the data storage unit 52b.

The data storage unit 52b stores the acquisition data 41 acquired by the interrupt handling unit 52a. The acquisition data 41 stored in the data storage unit 52b is written in the HDD 4 after the end of the measurement. The acquisition data 41 written in the HDD 4 is subjected to analysis by the power data analysis unit 7, and a consumption power profile is produced.

The power data analysis unit 7 analyzes the acquisition data 41 and produces the consumption power profile. The power data analysis unit 7 distributes the amount of consumption power to the cores 23a based on the information in terms of the performance of the cores 23a, and calculates the amount of consumption power of functions operated in each core 23a.

The power data analysis unit 7 also calculates the amount of consumption power in the idle state and the ratio of the amount of consumption power to the total amount of consumption power. The power data analysis unit 7 writes, as analysis data 42, the calculated amount of consumption power and the ratio of the amount of consumption power to the total amount of consumption power in the HDD 4.

The power data analysis unit 7 includes a determination unit 71 and a calculation unit 72. The determination unit 71 determines, using the data of the CLK event included in the performance information 41a, whether an idle state occurs. More specifically, when the interrupt by the CLK event does not occur at fixed time intervals, the determination unit 71 determines that the idle state has occurred.

The Interrupt by the CLK event occurs at the fixed time intervals. However, in the idle state, no interrupt occurs but the value for the CLK event is added cumulatively. For example, when values for two successive CLK events are denoted as $t_{n-1}$ and $t_n$, the determination unit 71 determines, based on $t_n - t_{n-1}$, whether the idle state exists or not.

That is, in a case where time has elapsed, while no CLK event data occurs, over a period longer than or equal to the sampling interval of the CLK event×N, the determination unit 71 determines that the idle state has occurred. Here, N is a positive integer that is determined based on the granularity of the idle state. For example, N is in a range of 5 to 10.

The calculation unit 72 calculates the power consumed in the idle state based on values of other events included in sampling data at $t_n$. More specifically, the calculation unit 72 applies the value of the event of the sampling data to the consumption power model used by the event determination unit 51a thereby calculating the amount of consumption power based on the consumption power model, and the calculation unit 72 determines the difference between the calculated amount of consumption power and the amount of consumption power included in the same sampling data, to be the amount of consumption power in the idle state.

Note that the power measurement unit 5 and the power data analysis unit 7 are realized by the CPU 2 by loading a power measurement program and a power data analysis program from the HDD 4 into the main memory 3 and executing them. The power measurement program and the power data analysis program may be read out, for example, from a DVD and installed in the information processing apparatus 1. Alternatively, the power measurement program and the power data analysis program may be stored in database or the like of another information processing apparatus coupled via a Local Area Network (LAN), and the power measurement program and the power data analysis program may be read out from the database and installed in the information processing apparatus 1.

Figure 4:
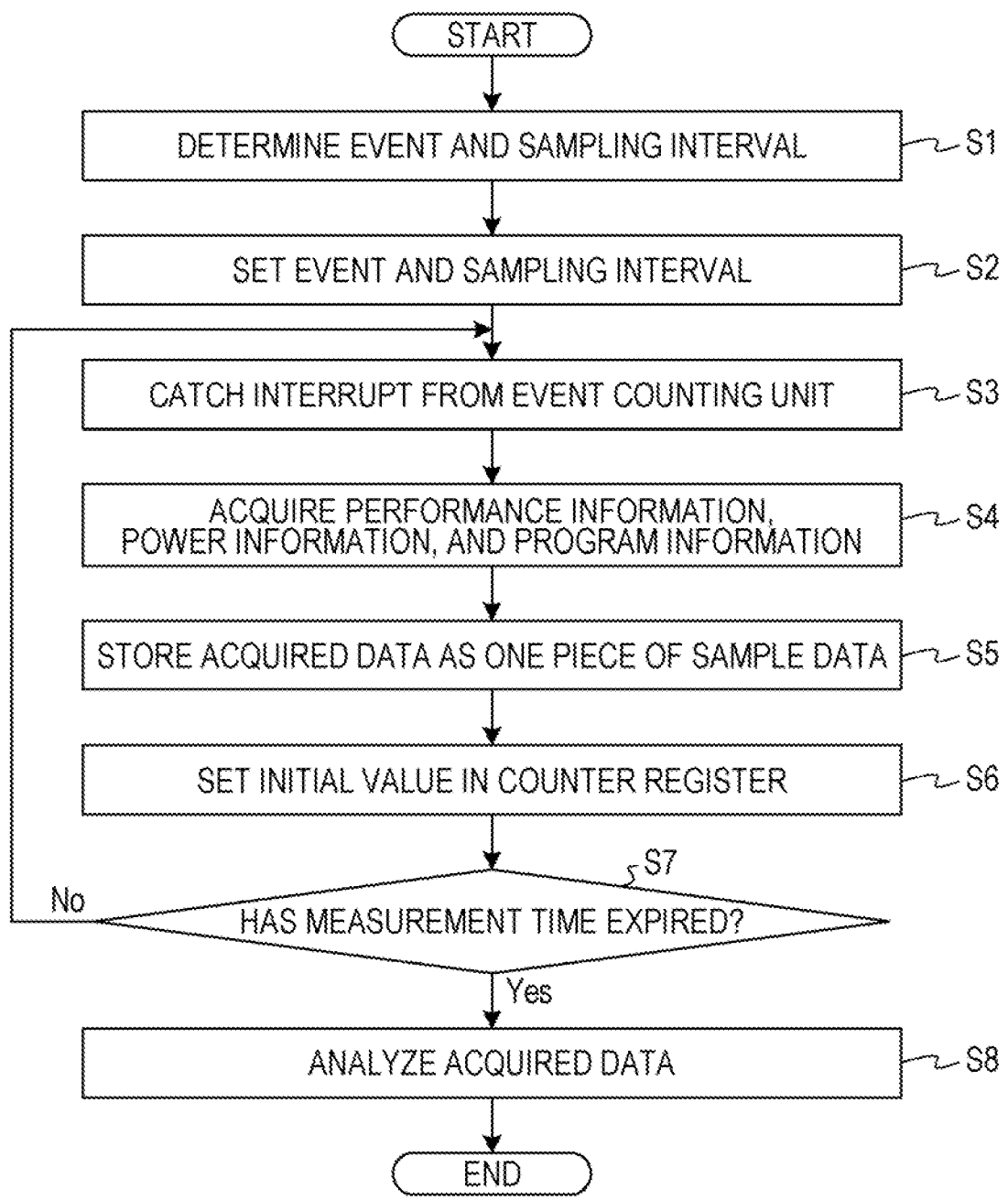
FIG. 4 is a diagram illustrating an example of an operational flowchart for a power measurement unit and a power data analysis unit, according to an embodiment.

Next, a flow of a process performed by the power measurement unit 5 and the power data analysis unit 7 is described below. FIG. 4 is an operational flowchart illustrating the flow of the process performed by the power measurement unit 5 and the power data analysis unit 7. As illustrated in FIG. 4, the power measurement unit 5 determines events, other than the CLK event, in response to which an interrupt is to be generated, and also determines the sampling interval therefor (step S1). The power measurement unit 5 sets, in the event counter unit 21, the events and the sampling intervals for the determined events and the CLK event (step S2). Note that the processes determined and set in step S1 and step S2 are performed by the measurement control unit 51.

Thereafter, when the program to be measured is executed and the measurement is started, the interrupt handling unit 52a catches the interrupt issued by the event counter unit 21 (step S3), and acquires the performance information 41a, the power information 41b, and the program information 41c (step S4). The interrupt handling unit 52a stores the acquired data, as one piece of sampling data, in the storage unit 52b (step S5), and sets an initial value in a counter register corresponding to the event that caused the interrupt (step S6).

The interrupt handling unit 52a determines whether the measurement time has expired (step S7). In a case where the measurement time has not yet expired, the processing flow returns to step S3. However, in a case where the measurement time has expired, the measurement process is ended.

After the end of the measurement, the power measurement unit 5 writes the acquisition data 41 stored in the data storage unit 52b into the HDD 4, and ends the process. Thereafter, the power data analysis unit 7 reads the acquisition data 41 from the HDD 4 and analyzes the acquisition data 41 (step S8), and the power data analysis unit 7 writes an analysis result, as analysis data 42, in the HDD 4.

Figure 5:
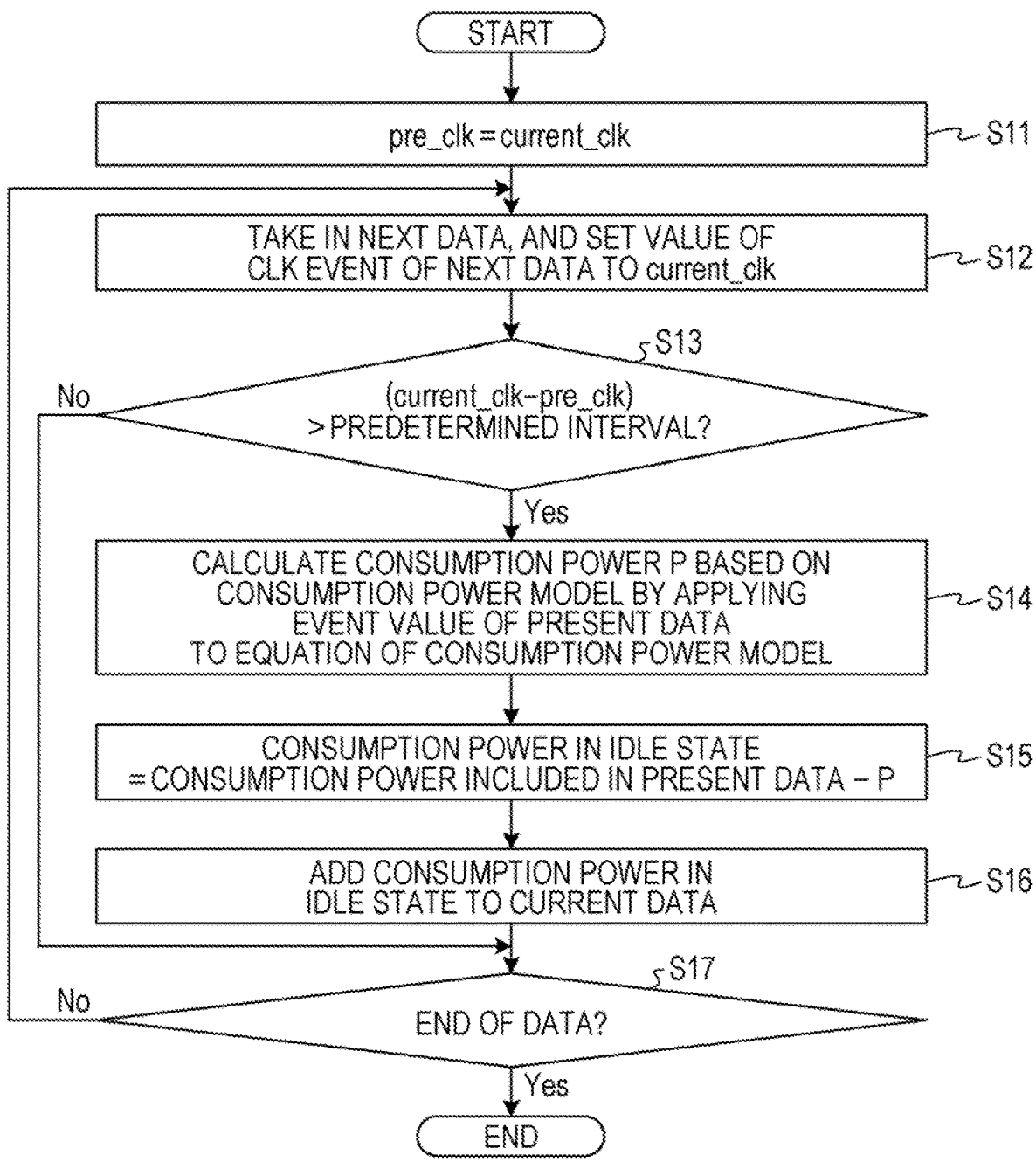
FIG. 5 is a diagram illustrating an example of an operational flowchart for calculating power consumed in an idle state, according to an embodiment.
Figure 8A:
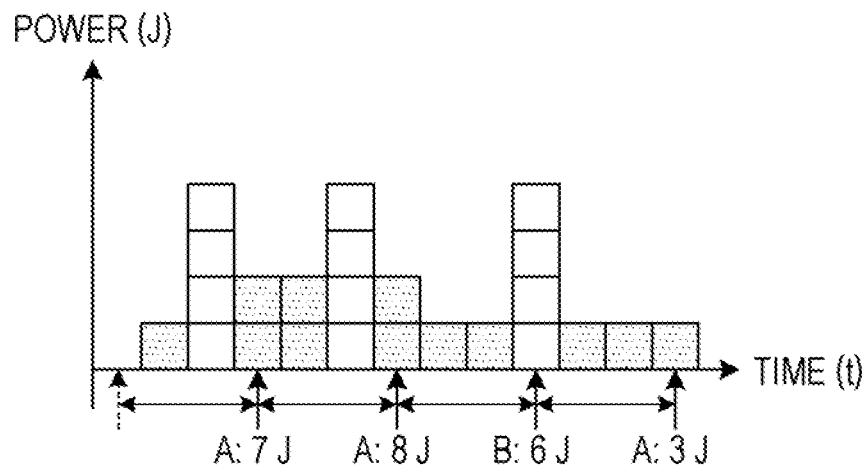
FIG. 8A is a diagram illustrating an example in which sampling is performed at fixed time intervals.
Figure 8B:
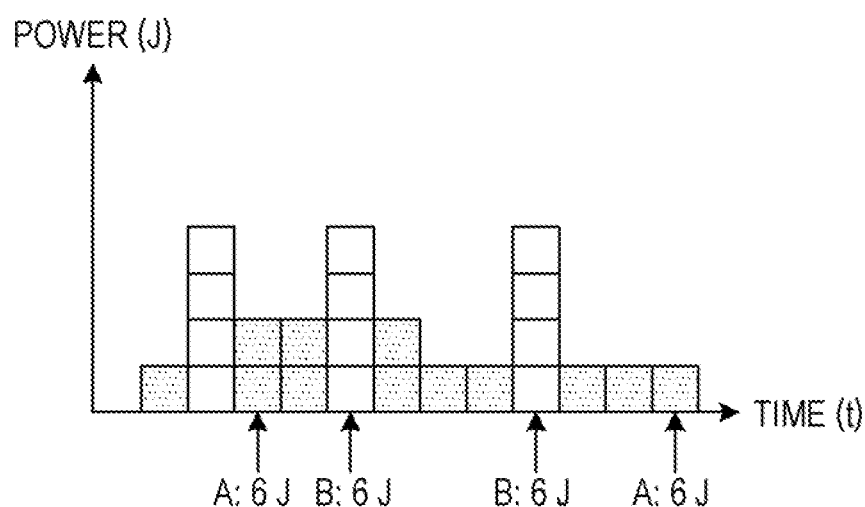
FIG. 8B is a diagram illustrating an example in which sampling is performed each time a particular fixed amount of power is consumed.

Next, a flow of a process of calculating the amount of consumption power in the idle state is described below. FIG. 5 is an operational flowchart illustrating the flow of the process of calculating the power consumed in the idle state. Note that the process of calculating the amount of consumption power in the idle state is performed as part of the process in step S8 in FIG. 4, that is, as part of the analysis of the acquisition data 41.

As illustrated in FIG. 5, the power data analysis unit 7 sets pre_clk=current_clk (step S11). Note that pre_clk denotes a value of a CLK event of previous data, and current_clk denotes a value of a CLK event of current data. Here the data is acquisition data 41 acquired by one sampling operation in response to an interrupt by the CLK event. The power data analysis unit 7 then reads a next piece of data and sets the value of the CLK event of the next piece of data as current_clk (step S12).

The power data analysis unit 7 determines whether the value obtained as a result of subtracting pre_clk from current_clk is larger than a predetermined interval value (step S13). Here, the predetermined interval value is the sampling interval×N. In a case where the value obtained as a result of subtracting pre_clk from current_clk is not larger than the interval value, the power data analysis unit 7 proceeds to step S17.

On the other hand, in a case where the value obtained as a result of subtracting pre_clk from current_clk is larger than the interval value, the power data analysis unit 7 applies the event value of the current data to the consumption power model equation thereby calculating the amount of consumption power P based on the consumption power model (step S14). The power data analysis unit 7 calculates the amount of consumption power in the idle states as a value obtained as a result of subtracting P from the amount of consumption power included in the current data (step S15), and adds the amount of consumption power in the idle state to the current data (step S16).

The power data analysis unit 7 then determines whether the process is completed for all pieces of data (step S17). In a case where the process is not completed for all the piece of data, the processing flow returns to step S12. In a case where the process is completed for all the pieces of data, the process of calculating the amount of consumption power in the idle state is ended. Note that the power data analysis unit 7 produces a consumption power profile using the acquisition data 41 including the added data of the amount of consumption power in the idle state.

As described above, the power data analysis unit 7 identifies an occurrence of an idle state by using the CLK event value, and, when an occurrence of an idle state is detected, the power data analysis unit 7 calculates the amount of consumption power in the idle state thereby accurately calculating the amount of consumption power of a program.

FIGS. 6A and 6B are diagrams illustrating an effect achieved by the power data analysis unit 7. FIG. 6A illustrates a consumption power profile in a case where information as to the idle state is not obtained. FIG. 6B illustrates a consumption power profile in a case where information as to the idle state is obtained. In FIG. 6A, the amount of consumption power of "funcA" of "ProgramA" is "100 J" and the ratio is "50.0%" which is the highest of all.

On the other hand, in FIG. 6B, the amount of consumption power of "IDLE" indicating the idle state is "40 J", and the ratio is "20.0%", while the amount of consumption power of "funcB" of "ProgramA" is "80 J", and the ratio is "40.0%" which is the highest of all. From FIGS. 6A and 6B, it can be seen that when the situation as to the idle state is not grasped, the amount of consumption power in the idle state is added to the actual amount of consumption power of "funcA" of "ProgramA".

In the embodiments described above, the determination unit 71 of the power data analysis unit 7 makes the judgement based on the sampling data of the CLK event as to whether the CPU 2 is in an idle state. In a case where the determination unit 71 determines that the CPU 2 is in the idle state, the calculation unit 72 calculates the amount of consumption power during the idle state, based on the amount of consumption power P calculated using the consumption power model and the amount of consumption power included in the sampling data. Thus, the power data analysis unit 7 is capable of removing the amount of power consumed during the idle state and accurately calculating the amount of consumption power of the program.

In the embodiments described above, when the difference between two successive sampling data of the CLK event is larger than the predetermined threshold value, the determination unit 71 determines that the CPU 2 is in the idle state, which makes it possible to accurately detect the idle state.

In the embodiments described above, the calculation unit 72 calculates the amount of consumption power in the idle state based on the amount of consumption power obtained as a result of subtracting the amount of consumption power P calculated based on the consumption power model from the amount of consumption power included in the sampling data. Thus, the calculation unit 72 is capable of accurately calculating the amount of consumption power in the idle state.

In the embodiments described above, it is assumed by way of example that the power data analysis unit 7 is realized using the same hardware as that of the power measurement unit 5. However, alternatively, the power data analysis unit 7 may be realized using hardware different from that of the power measurement unit 5. The CPU used as the hardware to realize the power data analysis unit 7 may not include the event counter unit 21 and the power acquisition unit 22.

In the embodiments described above, it is assumed by way of example that the CLK event is used in determining whether the CPU 2 is in the idle state. The information processing apparatus 1 may use another event that is capable of causing generation of an interrupt at fixed time intervals.

In the embodiment described above, it is assumed by way example that the consumption power profile is produced such that the amount of consumption power and the ratio thereof to the total power are calculated for each function of modules and described in the consumption power profile. Alternatively, the power data analysis unit 7 may calculate the amount of consumption power for each module, each program, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus to calculate consumption power of a processor caused by execution of a program, based on sampling data acquired by event-based sampling, the apparatus comprising;
    a memory; and
    the processor coupled to the memory, the processor configured to:
        determine whether the processor is in an idle state, by using the sampling data of a clock event, the clock event being an event which generates an interrupt at fixed time intervals when the processor is not in the idle state, and which generates the interrupt when a state of the processor changes from the idle state to a non-idle state, and
        in a case where the processor is in the idle state, calculate a first amount of consumption power of the processor in the idle state, based on a second amount of consumption power calculated using a consumption power model and a third amount of consumption power included in the sampling data.

2. The apparatus of claim 1, wherein
    the processor determines that the processor is in the idle state, when a difference between two successive pieces of the sampling data is larger than a predetermined threshold value.

3. The apparatus of claim 1, wherein
    the processor calculates the first amount of consumption power in the idle state, based on an amount of consumption power obtained as a result of subtracting the second amount of consumption power from the third amount of consumption power.

4. The apparatus of claim 1, wherein
    the clock event is an invent which counts a number of cycles that occur when the processor is in operation.

5. A method to calculate consumption power of a processor caused by execution of a program, based on sampling data acquired by event-based sampling, the method comprising:
    determining whether the processor is in an idle state, by using the sampling data of a clock event, the clock event being an event which generates an interrupt at fixed time intervals when the processor is not in the idle state, and which generates the interrupt when a state of the processor changes from the idle state to a non-idle state; and
    in a case where the processor is in the idle state, calculating a first amount of consumption power of the processor in the idle state, based on a second amount of consumption power calculated using a consumption power model and a third amount of consumption power included in the sampling data.

6. A non-transitory, computer-readable recording medium having stored therein a calculation program for causing a computer to execute a calculation process, the calculation program being configured to calculate consumption power of the computer caused by execution of a program, based on sampling data acquired by event-based sampling, the calculation process comprising:
  determining whether the computer is in an idle state, by using the sampling data of a clock event, the clock event being an event which generates an interrupt at fixed time intervals when the processor is not in the idle state, and which generates the interrupt when a state of the processor changes from the idle state to a non-idle state; and
  in a case where the computer is in the idle state, calculating a first amount of consumption power of the computer in the idle state, based on a second amount of consumption power calculated using a consumption power model and a third amount of consumption power included in the sampling data.

* * * * *